US008563185B2

(12) United States Patent
Assink et al.

(10) Patent No.: US 8,563,185 B2
(45) Date of Patent: Oct. 22, 2013

(54) PROCESS AND REACTOR FOR THE PRODUCTION OF HYDROGEN AND CARBON DIOXIDE AND A FUEL CELL SYSTEM

(75) Inventors: Gerrit Jan Barend Assink, Amsterdam (NL); Gert Jan Kramer, Amsterdam (NL); Arian Nijmeijer, Amsterdam (NL); Martin Van Sint Annaland, Enschede (NL)

(73) Assignee: Shell Oil Company, Houston, TX (US)

( * ) Notice: Subject to any disclaimer, the term of this patent is extended or adjusted under 35 U.S.C. 154(b) by 360 days.

(21) Appl. No.: 12/305,667

(22) PCT Filed: Jun. 28, 2007

(86) PCT No.: PCT/EP2007/056453
§ 371 (c)(1),
(2), (4) Date: Mar. 6, 2009

(87) PCT Pub. No.: WO2008/000782
PCT Pub. Date: Jan. 3, 2008

(65) Prior Publication Data
US 2011/0177410 A1    Jul. 21, 2011

(30) Foreign Application Priority Data
Jun. 30, 2006   (EP) .................................... 06116419

(51) Int. Cl.
*H01M 8/06* (2006.01)
*C01B 3/30* (2006.01)
*C01B 3/44* (2006.01)
*C01B 3/50* (2006.01)

(52) U.S. Cl.
USPC ........... 429/425; 429/420; 423/651; 48/127.9

(58) Field of Classification Search
USPC ................... 429/425, 420; 423/651; 48/127.9
See application file for complete search history.

(56) References Cited

U.S. PATENT DOCUMENTS

| 5,326,550 A | * | 7/1994 | Adris et al. ................... 423/652 |
| 5,741,474 A | | 4/1998 | Isomura et al. ............ 423/648.1 |

(Continued)

FOREIGN PATENT DOCUMENTS

| EP | 1024111 | 8/2000 | ................ C01B 3/32 |
| WO | WO9408890 | 4/1994 | ................ C01B 3/44 |

(Continued)

*Primary Examiner* — Raymond Alejandro
*Assistant Examiner* — Helen McDermott
(74) *Attorney, Agent, or Firm* — Charles W. Stewart

(57) ABSTRACT

The invention relates to a process for the production of hydrogen and carbon dioxide from a hydrocarbonaceous feedstock, comprising: a) supplying a gaseous hydrocarbonaceous feedstock and steam to a reaction zone comprising a steam reforming catalyst and catalytically reforming the hydrocarbonaceous feedstock to produce a reformed gas comprising hydrogen and carbon dioxide; b) supplying a molecular oxygen-comprising gas to the permeate side of a first hydrogen separation membrane; c) contacting a part of the hydrogen with a first hydrogen separation membrane, allowing the hydrogen to permeate through the first hydrogen separation membrane and combusting the hydrogen with the molecular oxygen at a permeate side of the first hydrogen separation membrane to produce all heat necessary for catalytic reforming the hydrocarbonaceous feedstock; d) contacting the remainder of the hydrogen with a second hydrogen separation membrane, which is separate from the first hydrogen separation membrane, and allowing the hydrogen to permeate through the second hydrogen separation membrane to obtain a first effluent comprising a substantially pure stream of hydrogen; and e) removing a stream rich in carbon dioxide from the reaction zone as a second effluent. The invention further related to a reactor for such process and to a fuel cell system comprising in series such reactor and a fuel cell.

10 Claims, 1 Drawing Sheet

(56) References Cited

U.S. PATENT DOCUMENTS

| | | | |
|---|---|---|---|
| 5,861,137 A | 1/1999 | Edlund | 423/652 |
| 5,938,800 A | 8/1999 | Verrill et al. | 48/127.9 |
| 6,348,278 B1 | 2/2002 | LaPierre et al. | 429/17 |
| 6,821,501 B2 * | 11/2004 | Matzakos et al. | 423/652 |
| 6,830,596 B1 * | 12/2004 | Deckman et al. | 48/95 |
| 6,881,394 B2 * | 4/2005 | Keller | 423/652 |
| 2006/0013762 A1 * | 1/2006 | Kuipers et al. | 423/651 |

FOREIGN PATENT DOCUMENTS

| | | | |
|---|---|---|---|
| WO | WO0202460 | 1/2002 | C01B 3/50 |
| WO | WO02070402 | 9/2002 | C01B 3/00 |
| WO | WO03031325 | 4/2003 | |

\* cited by examiner

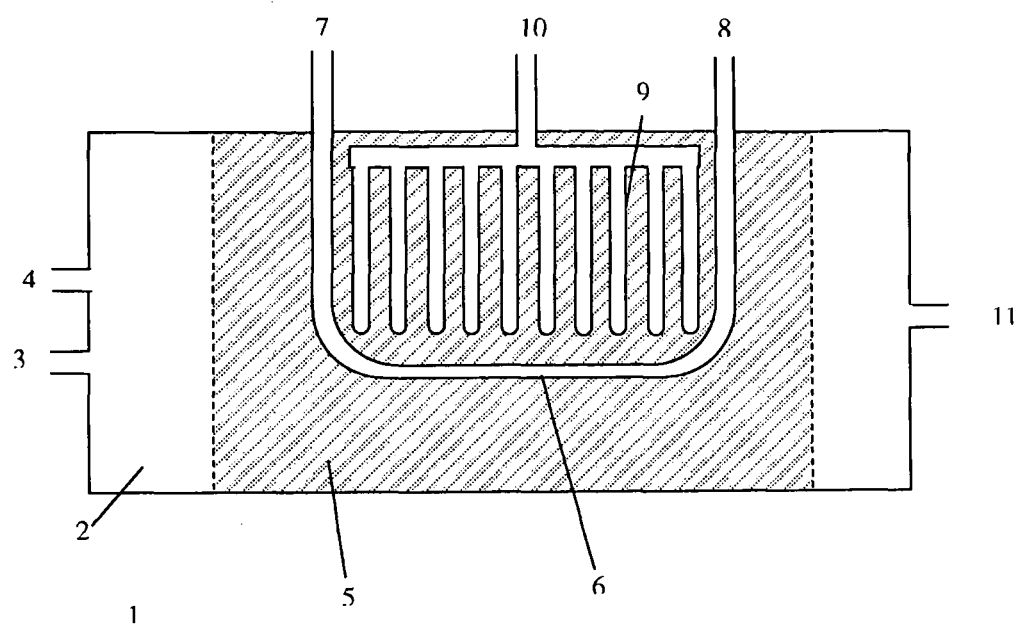

PROCESS AND REACTOR FOR THE PRODUCTION OF HYDROGEN AND CARBON DIOXIDE AND A FUEL CELL SYSTEM

The present application claims priority from European Patent Application 06116419.0 filed 30 Jun. 2006.

FIELD OF THE INVENTION

The present invention relates to a process for the production of hydrogen and carbon dioxide from a hydrocarbonaceous feedstock, to a reactor for such process, and to a fuel cell system comprising in series such reactor and a fuel cell.

BACKGROUND OF THE INVENTION

Hydrogen for fuel cells can be produced by means of fuel processing. In a fuel processor, a hydrocarbonaceous fuel is converted into a hydrogen-rich gas stream that can be used in a fuel cell for the generation of electricity.

Typically in a fuel processor, the hydrocarbonaceous fuel is first reacted with oxygen and/or steam by means of catalytic partial oxidation, autothermal reforming, steam reforming or a combination of one or more thereof to obtain a gas mixture comprising carbon oxides and hydrogen. The thus-obtained gas mixture is subsequently reacted with steam over a water-gas shift conversion catalyst to convert carbon monoxide into carbon dioxide with concurrent production of hydrogen. A gaseous stream comprising hydrogen and carbon dioxide is thus obtained. This stream may be fed to a fuel cell, optionally after purification.

Fuel processors that integrate steam reforming of hydrocarbonaceous streams with selective hydrogen removal are also described in the art, for example in WO 02/070402, U.S. Pat. No. 5,938,800, U.S. Pat. No. 6,348,278, US 2006/0013762 and U.S. Pat. No. 5,861,137. Such integrated steam reforming/hydrogen separation devices operate at lower temperatures than conventional steam reforming reactors and are not limited by normal equilibrium limitations. In such integrated devices, hydrocarbons are reformed to carbon dioxide and hydrogen according to (in the case of methane):

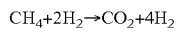

$$CH_4 + 2H_2O \rightarrow CO_2 + 4H_2$$

Advantages of such integrated steam reformer/hydrogen removal devices as compared to fuel processors without integrated hydrogen removal are that no separate reaction zone for the water-gas shift conversion is needed and that a substantially pure stream of hydrogen and a separate stream comprising carbon dioxide are obtained.

In WO 02/070402 is disclosed a process and apparatus for steam reforming of a vaporizable hydrocarbon to produce $H_2$ and $CO_2$, using a membrane steam reforming reactor and flame-less distributed combustor. A hydrogen selective separation membrane is provided to remove the produced hydrogen from the reaction. The flame-less distributed combustor provides the heat to drive the steam reforming reaction. It is mentioned in WO 02/070402 that part of the produced hydrogen can be directed to the flame-less distributed combustor. Disadvantage of the process and apparatus of WO 02/070402 is that it requires the use of an additional separate flame-less distributed combustor. Furthermore, the thickness of the catalyst layer between the flame-less distributed combustor and the membrane is restricted due to heat transfer limitations.

In US 2006/0013762, a process for the production of hydrogen and carbon dioxide from hydrocarbons is disclosed. This process involves supplying a gaseous stream of hydrocarbons and a molecular oxygen-containing gas, e.g. air, oxygen enriched air or pure oxygen, to a first reaction zone containing a partial oxidation catalyst and catalytically partially oxidizing the hydrocarbons in the gaseous stream. The effluent of the first reaction zone is supplied together with a second gaseous stream of hydrocarbons and steam to a second reaction zone containing a steam reforming catalyst wherein the hydrocarbons are catalytically reformed. The heat required for the second steam reforming reaction is supplied by the effluent from the first reaction zone. In the second reaction zone hydrogen is separated from the reformed gas by a selective membrane and a gaseous stream rich in carbon dioxide is obtained.

In U.S. Pat. No. 5,861,137 is described a steam reformer comprising a fixed bed of steam reforming catalyst surrounding at least part of a hydrogen-permeable, hydrogen-selective membrane and a fixed bed of catalytic combustion catalyst arranged around at least part of the fixed bed of steam reforming catalyst. The steam reforming bed is heated by the heat generated by the catalytic combustion of reforming by-product gases and optionally part of the produced hydrogen with air.

In the integrated steam reforming/hydrogen removal process of the prior art, a substantially pure stream of hydrogen is obtained together with a $CO_2$ comprising gas stream. The $CO_2$ comprising gas stream is diluted with nitrogen unless substantially pure oxygen is used as the source of oxygen instead of air. However, pure oxygen is difficult and expensive to produce. Furthermore, the use of pure or even concentrated oxygen poses a practical hazard.

SUMMARY OF THE INVENTION

There is a need in the art for a process and reactor for the production of substantially pure hydrogen and concentrated carbon dioxide, without the need to use additional separate burners or substantially pure or concentrated oxygen.

It has been found that the above can be achieved by a process wherein catalytic reforming of hydrocarbons is performed in a bed of steam reforming catalyst provided with at least two hydrogen separation membranes for removal of hydrogen from the reaction zone and wherein the heat needed for the endothermic steam reforming reaction is provided by the reaction of part of the hydrogen with molecular oxygen on the permeate side of at least one of the hydrogen separation membrane.

Accordingly, the invention provides a process for the production of hydrogen and carbon dioxide from a hydrocarbonaceous feedstock, comprising:

a) supplying a gaseous hydrocarbonaceous feedstock and steam to a reaction zone comprising a steam reforming catalyst and catalytically reforming the hydrocarbonaceous feedstock to produce a reformed gas comprising hydrogen and carbon dioxide;

b) supplying a molecular oxygen-comprising gas to the permeate side of a first hydrogen separation membrane;

c) contacting a part of the hydrogen with a first hydrogen separation membrane, allowing the hydrogen to permeate through the first hydrogen separation membrane and combusting the hydrogen with the molecular oxygen at a permeate side of the first hydrogen separation membrane to produce all heat necessary for catalytic reforming the hydrocarbonaceous feedstock;

d) contacting the remainder of the hydrogen with a second hydrogen separation membrane, which is separate from the first hydrogen separation membrane, and allowing the hydrogen to permeate through the second hydrogen separation membrane to obtain a first effluent comprising a substantially pure stream of hydrogen; and e) removing a stream rich in carbon dioxide from the reaction zone as a second effluent.

Reference herein to a second hydrogen separation membrane separate from the first hydrogen separation membrane is to a second hydrogen separation membrane that does not form a continuous structure with the first hydrogen separation membrane.

The present invention provides a process for producing hydrogen and carbon dioxide, wherein the produced carbon dioxide is obtained in a concentrated form. There are no secondary streams of carbon dioxide from for instance an external heat source, as the heat needed for the endothermic steam reforming reaction is provided by oxidising part of the produced hydrogen. Furthermore, there is no need for using pure or concentrated oxygen.

A further advantage of the present invention is that by supplying a molecular oxygen-comprising gas to the permeate side of the hydrogen separation membrane, in situ conversion of hydrogen to water and heat is realised. The produced heat can be directly transferred back to the reaction zone through the membrane. There is no need for separate means for oxidation, such as a additional separate burner, and subsequent heat-exchange. Furthermore, by combusting the hydrogen in situ, a local temperature increase is obtained, which may result in improved local hydrogen permeation rates.

An even further advantage is that using separate membranes as first and second hydrogen separation membrane may allow for a flexible response to changing reaction conditions, by changing the number of first and/or second hydrogen separation membranes and/or membrane area.

In another aspect, the invention provides a reactor for the production of hydrogen and carbon dioxide from a hydrocarbonaceous feedstock comprising a reaction zone, wherein the reaction zone comprises a bed of steam reforming catalyst and at least a first and a second hydrogen separation membrane, the first and second hydrogen separation membranes each having a retentate side in open communication with the catalyst bed and a permeate side, which reactor further comprises:

inlets for introduction of the hydrocarbonaceous feedstock and steam into the reaction zone;

an inlet for molecular oxygen-comprising gas in fluid communication with the permeate side of the first hydrogen separation membrane;

an outlet for oxygen depleted gas in fluid communication with the permeate side of the first hydrogen separation membrane;

an outlet for hydrogen in fluid communication with the permeate side the second hydrogen separation membrane; and an outlet for discharging a stream rich in carbon dioxide from the reaction zone.

In a further aspect, the invention provides a fuel cell system comprising in series a reactor according to the invention and a fuel cell having an inlet for hydrogen, wherein the inlet for hydrogen of the fuel cell is in fluid communication with the outlet for hydrogen of the reactor.

BRIEF DESCRIPTION OF THE DRAWINGS

FIG. 1 shows a longitudinal section of a reactor according to the invention.

DETAILED DESCRIPTION OF THE INVENTION

In the process according to the invention, a hydrocarbonaceous feedstock is catalytically reformed with steam in a reaction zone containing a steam reforming catalyst to produce hydrogen and carbon dioxide. In the process according to the invention, a molecular oxygen-comprising gas is supplied to the permeate side of a first hydrogen separation membrane. Part of the hydrogen is permeates through the first hydrogen separation membrane and is subsequently combusted, with the molecular oxygen-comprising gas on the permeate side of the membrane to provide the heat needed for the endothermic steam reforming reaction. Reference herein to combusted is to any reaction of hydrogen with molecular oxygen to form at least water and an oxygen depleted gas. The remainder of the hydrogen permeates through a second hydrogen separation membrane, whereby a first effluent of substantially pure hydrogen is obtained. Reference herein to an effluent of substantially pure hydrogen is to an effluent comprising 95 mol %, preferably 99 mol %, more preferably 99.9 mol % of hydrogen based on the total number of moles in the effluent. By selectively removing hydrogen from the reaction zone, the reforming reaction can be operated at a reaction temperature that is lower than the reaction temperature of a conventional steam reforming reaction zone. Furthermore, the hydrocarbon conversion is completed by shifting the reaction equilibrium towards the products hydrogen and carbon dioxide. The carbon dioxide is discharged from the reaction zone in the form of a carbon dioxide rich second effluent. Reference hereinto a carbon dioxide rich second effluent is to an effluent comprising at least 5 mol %, preferably 15 mol %, more preferably 30 mol % of carbon dioxide based on the total number of moles in the effluent. It will be appreciated that the second effluent can comprise an amount of steam or water. In case the second effluent comprises carbon monoxide, this steam or water may be used to convert the carbon monoxide to carbon dioxide in an additional water-gas shift conversion. The remaining steam or water can easily be removed by techniques known in the art, such as condensation, and a concentrated stream of carbon dioxide is obtained.

Reference herein to a hydrogen separation membrane is to a membrane that is permeable to hydrogen and essentially impermeable to the other components in the reaction zone, such as carbon dioxide and steam, present in the reaction zone.

It will be appreciated that due to the hydrogen removal during the steam reforming, the equilibrium of the reaction is shifted and the water-gas shift conversion is as such integrated in the steam reforming. It will be appreciated that enough hydrogen should be permeated through the first and second hydrogen separation membranes to ensure the equilibrium of the reaction is shifted and carbon dioxide is formed. Preferably, at least 75% of the produced hydrogen is permeated through the first and second hydrogen separation membrane, more preferably in the range of from 90 to 100%, even more preferably in the range of from 97 to 100%, still even more preferably in the range of from 99 to 100%. Therefore, in principle no separate reaction zone for the water-gas shift conversion is needed.

By supplying a molecular oxygen-comprising gas to the permeate side of the first hydrogen separation membrane it is possible to combust hydrogen in situ with molecular oxygen after the hydrogen has permeated through the first hydrogen separation membrane. The hydrogen is combusted in situ at the permeate side of the membrane, i.e. at the surface of the permeate side of the membrane or close thereto. The heat generated by the reaction between hydrogen and molecular oxygen may subsequently be transferred back directly to the reaction zone through the membrane. In addition, the in situ combustion prevents the build-up of large amounts of explosive mixtures of hydrogen and molecular oxygen.

Preferably, at least 70% of the hydrogen permeated through the first hydrogen separation membrane, more preferably 90%, even more preferably in the range of 95 to 100%, is combusted with molecular oxygen at the permeate side of the membrane. As a consequence, there is no need to for an after treatment of the effluent, i.e. the third effluent, discharged from the permeate side of the first membrane, such as reacting hydrogen, remaining in the third effluent, in an afterburner with molecular oxygen to produce water and heat. It will be appreciated that if such an after treatment is performed, the obtained heat may be returned to the process.

The steam reforming catalyst may be any catalyst suitable for steam reforming. Such catalysts are known in the art. Typically, steam-reforming catalysts comprise a group VIII metal as catalytically active material on a catalyst carrier, usually a refractory oxide carrier. Preferably, the Group VIII metal is Ni or a noble metal. In the case of the use of Ni as catalytically active metal, it might be necessary to regenerate the steam reforming catalyst of the second reaction after a certain period of operation. Noble metals are particularly suitable as catalytically active material, since they are less prone to coking than Ni-comprising metals. Preferred noble metals are rhodium, iridium, palladium and/or platinum, especially rhodium and/or iridium. The catalytically active metal is preferably supported on an inert high-temperature resistant support, usually a refractory oxide support. Typically, the catalyst comprises the catalytically active metal(s) in a concentration in the range of from 0.02 to 10% by weight, based on the total weight of the catalyst, preferably in the range of from 0.1 to 5% by weight. The catalyst may further comprise a performance-enhancing inorganic metal cation selected from Al, Mg, Zr, Ti, La, Hf, Si, Ba, and Ce which is present in intimate association supported on or with the catalytically active metal, preferably a zirconium cation.

Preferred refractory oxides are zirconia-based, more preferably comprising at least 70% by weight zirconia, for example selected from known forms of, partially, stabilised zirconia or substantially pure zirconia. Preferred zirconia-based materials comprise zirconia stabilised or partially-stabilised by one or more oxides of Mg, Ca, Al, Y, La or Ce.

The steam reforming catalyst may be present in the reaction zone in any suitable configuration. Suitable configurations include fixed catalyst bed arrangements and arrangements that in use form a fluidised bed. Fluidised bed arrangements are preferred, as such arrangements allow for a good distribution of heat throughout the catalyst bed. In case of a fluidised bed arrangement, it will be appreciated that the catalysts particle size must be chosen such that is suitable for use in a fluidised bed. Suitable particles sizes are typically in the order of a few to a few hundreds of micrometers, typically in the range of from 10 to $500 \times 10^{-6}$ m, preferably of from 40 to $200 \times 10^{-6}$ m. The catalyst particles in the reaction zone may be diluted with a solid diluent, such as alumina.

The hydrogen separation membrane may be any hydrogen separation membrane known in the art. Preferably, the hydrogen separation membranes have a permselectivity of hydrogen over carbon dioxide, carbon monoxide, methane or nitrogen of at least 100, more preferably in the range of from 1000 to 100,000, even more preferably of from 5,000 to 100,000. Reference herein to permselectivity of a membrane is to the ratio of the permeability of a first gas to the permeability of a second gas. Examples of such membranes are microporous silica membranes or palladium or platinum comprising membranes. Palladium or platinum alloys may also be used. Alloying palladium or platinum with an additional metal may improve the performance of the membrane, for example a good hydrogen permeability is obtained for a palladium membrane comprising up to 23% by weight of silver. Palladium or palladium alloy comprising membranes are most preferred. Palladium or palladium alloy comprising membranes may show a high hydrogen permeability and permselectivity. The palladium or platinum comprising membranes may be self-supporting dense palladium or platinum comprising membranes or membranes comprising a thin layer of palladium or platinum containing film supported by a hydrogen permeable substrate, for instance comprising a ceramic or metal, for instance tantalum and/or niobium. The substrate may support a palladium or platinum containing film on one or both sides. Membranes comprising a thin layer of palladium- or platinum-containing film supported by a substrate are particularly suitable for the process according to the invention as they combine high hydrogen permeability and permselectivity with sufficient mechanical strength. Such membranes are known in the art, for example from WO 02/070402 or U.S. Pat. No. 5,741,474.

The hydrogen separation membranes may have any known configuration suitable application in the present invention. Examples of suitable membrane configurations are flat sheet or tubular configurations. Preferably, the membranes are tubular. The first and second hydrogen separation membranes may independently be dead-end or open-ended tubular membranes. Preferably, the first hydrogen selective membrane is an open-ended membrane as this conveniently allows a continuous flow of molecular oxygen-comprising gas along the permeate side of the membrane. The hydrogen permeating through the second hydrogen separation membrane may be discharged from the permeate side of the membrane by means of a sweep gas, for example steam, or a vacuum applied to the membrane.

The first and second hydrogen separation membranes may individually be comprised of one or more separate membranes. Typically, the number of membranes will depend on the surface area of the separate membranes in combination with the required quantity of hydrogen to be permeated. It will be appreciated that enough membrane surface area must be provided to allow for the removal of the desired amount of hydrogen. The first and second hydrogen separation tubular membranes may be shaped in any suitable form such as straight tubes, U-shaped tubes or spiral tubes.

The first and second hydrogen separation membranes may be the same type of hydrogen separation membranes or may be different in composition or configuration. As a consequence, the first and second membrane may differ in for instance shape, hydrogen permeability, hydrogen permselectivity and/or surface area available for permeation.

Typically, the process according to the invention is operated at temperatures at which hydrogen and molecular oxygen will react instantly, without the need for ignition. In case a palladium or platinum comprising hydrogen separation membrane is used as the first membrane, the reaction between hydrogen and molecular oxygen on the permeate side of the first membrane may be catalysed by the palladium comprised in the first membrane. If an additional catalytic functionality is desired, the first hydrogen separation membrane may additionally comprise an oxidation catalyst at the permeate side of the membrane to catalyse the reaction between hydrogen and molecular oxygen. This oxidation catalyst may be any oxidation catalyst known. A suitable catalyst may for example comprise platinum supported on alumina. The oxidation catalyst may be supported on the membrane surface, individually supported or self-supporting in the form of for instance particles or gauzes. Preferably, the catalyst is supported on membrane surface.

The process according to the invention may be operated at any suitable pressure, typically in the range of from 1 to 100 bara, preferably of from 1 to 50 bara, more preferably of from 2 to 30 bara.

The process according to the invention can be operated at all temperatures suitable for steam reforming. Typically, the hydrogen permeability of the hydrogen separation membrane will increase with an increase in temperature. Due to the reduced stability of the hydrogen separation membranes at temperatures over 800° C., the temperature in the reaction zone is, preferably, in the range of from 200 to 800° C., more preferably of from 350 to 700° C.

The steam-to-carbon ratio of the hydrocarbonaceous feedstock and the steam supplied to the reaction zone is preferably such that the steam-to-carbon ratio is in the range of from 2.0 to 10, more preferably of from 3.0 to 7.0. Reference herein to the steam-to-carbon ratio is to the ratio of steam in the form of molecules, i.e. $H_2O$, to carbon atoms in the hydrocarbonaceous feedstock. Increasing the steam-to-carbon ratios above the stoichiometric ratio of 2 may result in an improved conversion of the hydrocarbonaceous feedstock and reduced formation of carbon monoxide.

Preferably, the molecular oxygen-comprising gas supplied to the permeate side of the first hydrogen separation membrane comprises sufficient molecular oxygen to react with essentially all of the hydrogen permeating through the first hydrogen separation membrane. More preferably, molecular oxygen-comprising gas is supplied to the permeate side of the hydrogen separation membrane in such amounts that the molecular oxygen-to-hydrogen ratio at permeate side of the membrane is at least 0.5, even more preferably in the range of from 0.75 to 10. Reference herein to molecular oxygen-to-hydrogen ratio is the ratio of molecular oxygen to molecular hydrogen, i.e. hydrogen permeated through the first hydrogen separation membrane.

If the process is operated under adiabatic conditions, the ratio of hydrogen permeated through the first and the second membrane is preferably at least 0.24, more preferably in the range of 0.24 to 1, even more preferably 0.24 to 0.5. The ratio of hydrogen permeated through the first and the second membrane is related to the membranes used and available surface area for permeation.

The hydrocarbonaceous feedstock may comprise any hydrocarbonaceous material that is gaseous under the operating conditions of the process of the invention. The hydrocarbonaceous feedstock may comprise oxygenated hydrocarbons, for example methanol or ethanol. The hydrocarbonaceous material may be liquid under Standard Temperature and Pressure conditions (STP; i.e. 0° C. and 1 atmosphere). It will be appreciated that the feedstock may be preheated if the feedstock is a liquid under STP conditions. Preferably, hydrocarbonaceous feedstock comprises light hydrocarbons that are gaseous under STP conditions, for example methane, ethane, propane or a mixture of two or more thereof. Examples of suitable mixtures are natural gas and LPG. More preferably, the hydrocarbonaceous feedstock comprises methane, even more preferably is natural gas.

It will be appreciated, that the hydrocarbonaceous feedstock and the steam may be supplied to the reaction zone separately or alternatively are first mixed and subsequently supplied as a mixture to the reaction zone.

The molecular oxygen-comprising gas that is supplied to the permeate side of the first hydrogen separation membrane may be for instance air, oxygen-enriched air or substantially pure oxygen. Preferably, the molecular oxygen-comprising gas is air. An advantage of the present invention is that the first effluent (substantially pure hydrogen), the second effluent ($CO_2$ rich) and the third effluent (effluent discharged from the permeate side of the first hydrogen separation membrane) are obtained separately. Therefore, there is no risk of diluting the second effluent with e.g. nitrogen and a more concentrated stream of carbon dioxide is obtained as the second effluent.

The present invention also provides a reactor for the production of hydrogen and carbon dioxide from a hydrocarbonaceous feedstock. The reactor will comprise a reaction zone comprising a bed of steam reforming catalyst. The reaction zone will further comprise at least a first and a second hydrogen separation membrane. The hydrogen separation membranes each have a retentate side, which is in open communication with the catalyst bed, and a permeate side. Reference herein to open communication is to a communication wherein there is no resistance to the flow of one or more particular components. The reactor further comprises:

inlets for introduction of the hydrocarbonaceous feedstock and steam into the reaction zone;

an inlet for molecular oxygen-comprising gas that is in fluid communication with the permeate side of the first hydrogen separation membrane;

an outlet for oxygen depleted gas (third effluent) that is in fluid communication with the permeate side of the first hydrogen separation membrane;

an outlet for hydrogen (first effluent) that is in fluid communication with the permeate side the second hydrogen separation membrane; and an outlet for discharging a stream rich in carbon dioxide (second effluent) from the reaction zone.

It will be appreciated that the reactor may comprise additional inlets and/or outlets if the number of separate hydrogen separation membranes is increased. It will also be appreciated that if the hydrocarbonaceous feedstock and steam are to be supplied to the reaction zone as a mixture, the inlets for the hydrocarbonaceous feedstock and steam are one and the same inlet or inlets. Furthermore, if hydrogen is removed from the permeate side of the second hydrogen separation membrane using a sweep gas, the reactor may comprise an inlet for sweep gas.

The reactor according to the invention is in particular suitable for the process according to the invention.

The retentate side of the first and second hydrogen separation membranes each is in open communication with the catalyst bed. Preferably, the retentate side of the first and second hydrogen separation membranes each is facing the catalyst bed. More preferably, the retentate side of the first and second hydrogen separation membranes are each in direct contact with the catalyst bed. Reference herein to direct contact is to a contact that will allow transfer of heat and hydrogen from the catalyst bed to the retentate side of the hydrogen separation and vice versa with a minimal resistance.

Preferably, the first and second hydrogen separation membranes each extend into and/or through the catalyst bed, by extending the hydrogen separation membranes into and/or through the catalyst bed the need for hydrogen to diffuse through the catalyst bed is reduced and the heat for the steam reforming reaction is evenly distributed over the catalyst bed. Actually, the in situ combustion of hydrogen permeating through the first hydrogen separation membrane may result in a locally increased temperature at the membrane interface. Such increased temperatures may locally improve the permeation rate of hydrogen.

The reactor according to the invention makes particularly efficient use of the membranes. In the reactor according to the invention the available membrane area is not only used to remove the produced hydrogen from the reaction zone, at least part of the available membrane area is used as heat exchange area for supplying the heat generated at the permeate side of the first hydrogen separation membrane to the reaction zone. Hydrogen is selectively transported through the second hydrogen separation membrane to the permeate side of the membrane and may be discharged from the permeate side of the second hydrogen separation membrane to the outlet for hydrogen. The hydrogen obtained from the permeate side of the second hydrogen separation membrane is substantially pure and is therefore very suitable as fuel cell reactant. Therefore, the outlet for hydrogen may be in fluid communication with an inlet for hydrogen of a fuel cell. The hydrogen will then be directly fed as reactant gas to the fuel cell. Thus, the invention also relates to a fuel cell system comprising in series a reactor according to the invention and a fuel cell having an inlet for hydrogen, wherein the inlet for hydrogen of the fuel cell is in fluid communication with the outlet for hydrogen of the reactor. The fuel cell may be any fuel cell that uses hydrogen as reactant, for example a Solid Oxide Fuel Cell (SOFC) or a Proton Exchange Membrane (PEM) fuel cell, preferably a PEM fuel cell.

In FIG. 1 is shown reactor 1 comprising a reaction zone 2. The reactor has inlet 3 for introduction of a hydrocarbonaceous feedstock and inlet 4 for introducing steam to reaction zone 2.

The hydrocarbonaceous feedstock and steam are contacted with bed of steam reforming catalyst 5, which is located inside reaction zone 2. The reaction zone 2 further comprises tubular U-shaped hydrogen separation membrane 6, which permeate side is in fluid communication with inlet 7 for supplying air to the permeate side of hydrogen separation membrane 6. The permeate side of hydrogen separation membrane 6 is further in fluid communication with outlet 8 for discharging oxygen depleted air and steam or water. The reaction zone also comprises a number of tubular dead-end hydrogen separation membranes 9, which permeate sides are in fluid communication with outlet 10 for hydrogen. In this embodiment, both hydrogen separation membrane 6 and hydrogen separation membrane 9 extend into the bed of stream reforming catalyst 5. The reactor further comprises outlet 11 for discharging an effluent comprising carbon dioxide and steam.

EXAMPLES

Example 1

Hydrogen Combustion

The hydrogen permeation through the first hydrogen separation membrane and subsequent combustion with oxygen has been determined. The experiments were conducted using a reaction zone comprising a fluidised bed of steam reforming catalyst and a single U-shaped tubular hydrogen separation membrane (ex. REB Research and Consulting). Each tubular membrane comprises a porous tantalum/niobium tube reinforced with Inconel that is coated on both the inside and the outside with a thin palladium layer. The temperature in the reaction zone was controlled such that the temperature was approximately 500° C. The properties of the membrane are reported in table 1.

Hydrogen was supplied to the reaction zone in combination with an inert carrier gas. Oxygen was supplied to the permeate side of the hydrogen separation membrane. The oxygen was supplied through the inlet for molecular oxygen-comprising gas as part of a sweep gas, which further comprised an inert gas. The oxygen depleted third effluent was discharged from the outlet for oxygen-depleted gas. The molecular oxygen-to-hydrogen ratio was adjusted by changing the ratio of oxygen and inert gas in the sweep gas supplied to the permeate side of the hydrogen separation membrane, while the overall flow rate of the sweep gas remained constant. The hydrogen permeation through the membrane, non-combusted hydrogen discharged via the third effluent and hydrogen conversion were determined. The results are shown in table 2.

It is clear from the results depicted in table 2 that most of the hydrogen permeating through the membrane reacts readily with the molecular oxygen in the sweep gas at the permeate side of the hydrogen separation membrane. If the molecular oxygen-to-hydrogen ratio reached 0.75 essentially all permeating hydrogen is combusted, without the need to supply and additional oxidation catalyst at the permeate side of the hydrogen separation membrane.

TABLE 1

|  | U shape | Dead end |
| --- | --- | --- |
| Number of membranes | 1 | 10 |
| Diameter ($\times 10^{-3}$ m) | 3.2 | 3.2 |
| Length ($\times 10^{-3}$ m) | 410 | 202 |
| Pd layer outside ($\times 10^{-6}$ m) | 1.5 | 4-5 |
| Pd layer inside ($\times 10^{-6}$ m) | 0.3 | 4-5 |
| Total membrane area ($m^2$) | $3.8642 \times 10^{-3}$ | $1.9038 \times 10^{-2}$ |

TABLE 2

| Total feed flow rate | 2000 Nml/min |
| --- | --- |
| Hydrogen feed flow rate | 700 Nml/min |
| Carrier gas feed flow rate | 1300 Nml/min |
| Reactor pressure | 3 bara |
| Reactor temperature | 500° C. |
| Sweep gas flow rate | 4500 Nml/min |

| $O_2/H_2$ | $H_2$ permeation (Nml/min) | $H_2$ at permeate side (Nml/min) | $H_2$ conversion (%) |
| --- | --- | --- | --- |
| 0 | 242.05 | 242.05 | 0 |
| 0.58 | 312.29 | 29.14 | 90.67 |
| 0.75 | 320.85 | 1.07 | 99.67 |
| 0.81 | 326.94 | 0.64 | 99.81 |

Example 2

Steam Methane Reforming

Hydrogen and carbon dioxide were produced using a process according to the invention. Methane and steam were supplied to a reaction zone comprising a fluidised bed of steam reforming catalyst and a single U-shaped tubular first hydrogen separation membrane (ex. REB Research and Consulting) and 10 dead-end tubular second hydrogen separation membranes (ex. REB Research and Consulting). Each tubular membrane comprises a porous tantalum/niobium tube reinforced with Inconel that is coated on both the inside and the outside with a thin palladium layer. The properties of the membrane are reported in table 1.

Methane was supplied to the reaction zone in combination with steam and an inert carrier gas. Oxygen was supplied to the permeate side of the hydrogen separation membrane. The oxygen was supplied through the inlet for molecular oxygen-comprising gas as part of a sweep gas, which further comprised an inert gas. The oxygen depleted third effluent was discharged from the outlet for oxygen-depleted gas. The results are shown in table 3.

TABLE 3

| Inlet conditions | |
| --- | --- |
| Temperature | 500° C. |
| Pressure | 2 bara |
| $CH_4$ flow | 329.6 Nml/min |
| Inert carrier gas flow | 656.4 Nml/min |
| $H_2O$ flow | 1317 Nml/min |
| $H_2O/CH_4$ ratio | 4 |
| Inert carrier gas/$CH_4$ ratio | 2 |
| Sweep gas flow rate | 5329 Nml/min |
| $O_2$ concentration in sweep gas | 2.7 vol % |
| Results | |
| $CH_4$ conversion | 74.2% |
| $CO_2$ in second effluent | 228.4 Nml/min |
| $CO/CO_2$ ratio in second effluent | 0.06 |
| Ratio $H_2$ combusted/$H_2$ recovered | >0.25 |
| Purity $H_2$ recovered | >99.9 |

What is claimed is:

1. A process for the production of hydrogen and carbon dioxide from a hydrocarbonaceous feedstock, comprising:
    a) supplying a gaseous hydrocarbonaceous feedstock and steam to a reaction zone comprising a bed of steam reforming catalyst and catalytically reforming the hydrocarbonaceous feedstock to produce a reformed gas comprising hydrogen and carbon dioxide in said reaction zone;
    b) supplying a molecular oxygen-comprising gas to the permeate side of a first hydrogen separation membrane which is present within the bed of steam reforming catalyst;
    c) contacting a part of the hydrogen of the reformed gas with the first hydrogen separation membrane, allowing the hydrogen to permeate through the first hydrogen separation membrane and combusting the thus-permeated hydrogen with the molecular oxygen at a permeate side of the first hydrogen separation membrane to produce heat necessary for catalytic reforming the hydrocarbonaceous feedstock, wherein the produced heat is transferred to the reaction zone through the hydrogen separation membrane;
    d) contacting the remainder of the hydrogen of the reformed gas with a second hydrogen separation membrane, which is separate from the first hydrogen separation membrane and which is also present within the bed of steam reforming catalyst, and allowing the hydrogen to permeate through the second hydrogen separation membrane to obtain a first effluent comprising a substantially pure stream of hydrogen; and
    e) removing a stream rich in carbon dioxide from the reaction zone as a second effluent.

2. A process according to claim 1, wherein the molar ratio of molecular oxygen to molecular hydrogen at the permeate side of the first hydrogen separation membrane is at least 0.5.

3. A process according to claim 1, wherein the temperature in the reaction zone is in the range of from 200 to 800° C.

4. A process according to claim 1, wherein the pressure in the reaction zone is the range of from 1 to 100 bara.

5. A process according to claim 1, wherein any hydrogen separation membrane comprises palladium, platinum or a palladium or platinum alloy.

6. A process according to claim 1, wherein the reaction zone comprises the bed of steam reforming catalyst in a fluidised state.

7. A reactor for the production of hydrogen and carbon dioxide from a hydrocarbonaceous feedstock comprising a reaction zone, wherein the reaction zone comprises a bed of steam reforming catalyst and at least a first and a second hydrogen separation membrane, the first and second hydrogen separation membranes each having a retentate side in open communication with the catalyst bed and a permeate side, wherein the first and second hydrogen separation membranes each extend into and/or through the bed of steam reforming catalyst which reactor further comprises:
    inlets for introduction of the hydrocarbonaceous feedstock and steam into the reaction zone;
    an inlet for introduction of molecular oxygen-comprising gas to the permeate side of the first hydrogen separation membrane;
    an outlet for discharging oxygen depleted gas from the permeate side of the first hydrogen separation membrane;
    an outlet for discharging hydrogen from the permeate side the second hydrogen separation membrane; and
    an outlet for discharging a stream rich in carbon dioxide from the reaction zone.

8. A reactor according to claim 7, wherein the bed of steam reforming catalyst is in a fluidised bed arrangement.

9. A reactor according to claim 7, wherein the second hydrogen separation membrane is separate from the first hydrogen separation membrane.

10. A fuel cell system comprising in series a reactor according to claim 7 and a fuel cell having an inlet for hydrogen, wherein the inlet for hydrogen of the fuel cell is in fluid communication with the outlet for hydrogen of the reactor.

* * * * *